US007969060B2

(12) United States Patent
Ihle et al.

(10) Patent No.: US 7,969,060 B2
(45) Date of Patent: Jun. 28, 2011

(54) ELECTRIC MOTOR

(75) Inventors: Olai Ihle, Eckental (DE); Thomas Peterreins, Nuremberg (DE)

(73) Assignee: Buehler Motor GmbH, Nuremberg (DE)

( * ) Notice: Subject to any disclaimer, the term of this patent is extended or adjusted under 35 U.S.C. 154(b) by 1096 days.

(21) Appl. No.: 11/790,818

(22) Filed: Apr. 27, 2007

(65) Prior Publication Data
US 2007/0286753 A1 Dec. 13, 2007

(30) Foreign Application Priority Data
Apr. 28, 2006 (DE) .......................... 10 2006 021 247

(51) Int. Cl.
H02K 1/12 (2006.01)
(52) U.S. Cl. .......................................... 310/257; 310/89
(58) Field of Classification Search .................... 310/89, 310/257
See application file for complete search history.

(56) References Cited

U.S. PATENT DOCUMENTS

| 4,381,465 | A  | * | 4/1983 | Renkl et al. ................. 310/49.12 |
| 4,794,292 | A  | * | 12/1988 | Torisawa ........................ 310/257 |
| 4,841,190 | A  | * | 6/1989 | Matsushita et al. ........... 310/257 |
| 6,663,362 | B1 |   | 12/2003 | Lentz et al. |
| 6,774,512 | B2 | * | 8/2004 | Takagi et al. ............... 310/49.08 |
| 7,071,593 | B2 | * | 7/2006 | Matsushita et al. ........... 310/257 |
| 7,074,019 | B2 |   | 7/2006 | Knoll |
| 7,205,697 | B2 | * | 4/2007 | Rhyu et al. ..................... 310/257 |
| 7,692,355 | B2 | * | 4/2010 | Ihle et al. ...................... 310/257 |
| 2002/0005670 | A1 | * | 1/2002 | Takagi et al. ............... 310/49 R |
| 2002/0180302 | A1 |   | 12/2002 | Takayuki et al. |
| 2005/0046305 | A1 | * | 3/2005 | Matsushita et al. ........... 310/257 |
| 2007/0075605 | A1 | * | 4/2007 | Enomoto et al. ............... 310/257 |

FOREIGN PATENT DOCUMENTS

| DE | 80 17 528.6 U1 | 3/1981 |
| DE | 35 14 895 C2 | 10/1986 |
| DE | 102 26 145 A1 | 11/2004 |
| EP | 1 263 115 A2 | 4/2002 |

* cited by examiner

Primary Examiner — Thanh Lam
(74) Attorney, Agent, or Firm — Jacobson Holman PLLC

(57) ABSTRACT

The invention relates to an electric motor comprising a permanent magnet rotor, which is supported rotationally about a central axis, a wound stator having a cylinder ring-shaped stator winding, claw poles, which are disposed perpendicularly to ring disc-shaped stator plates and around the central axis, and a cylinder jacket-shaped yoke ring, the length of the claw poles in the axially parallel direction being clearly greater than half the inner diameter of the stator. It is the object of the invention to provide an electric motor, in which the stator is composed of the least number of components, requires simple assembly and has a robust structure and optimum efficiency, thereby enabling greater design flexibility, usability of installation space and thus an economic construction. This objective is solved according to the invention in that the magnetically conductive part of the stator comprises a cylinder jacket-shaped yoke ring and two ring disc-shaped stator plates, the stator plates are each designed as a single piece with a plurality of claw poles and the ring disc-shaped stator plates comprise ends, which are connected to one another.

18 Claims, 4 Drawing Sheets

Fig. 1
Fig. 2
Fig. 3
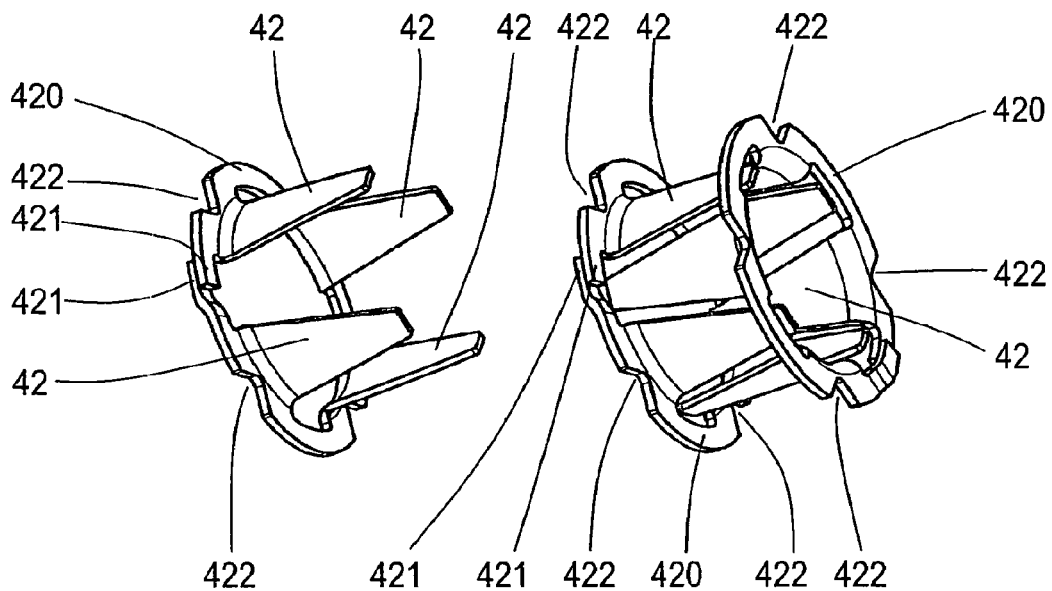
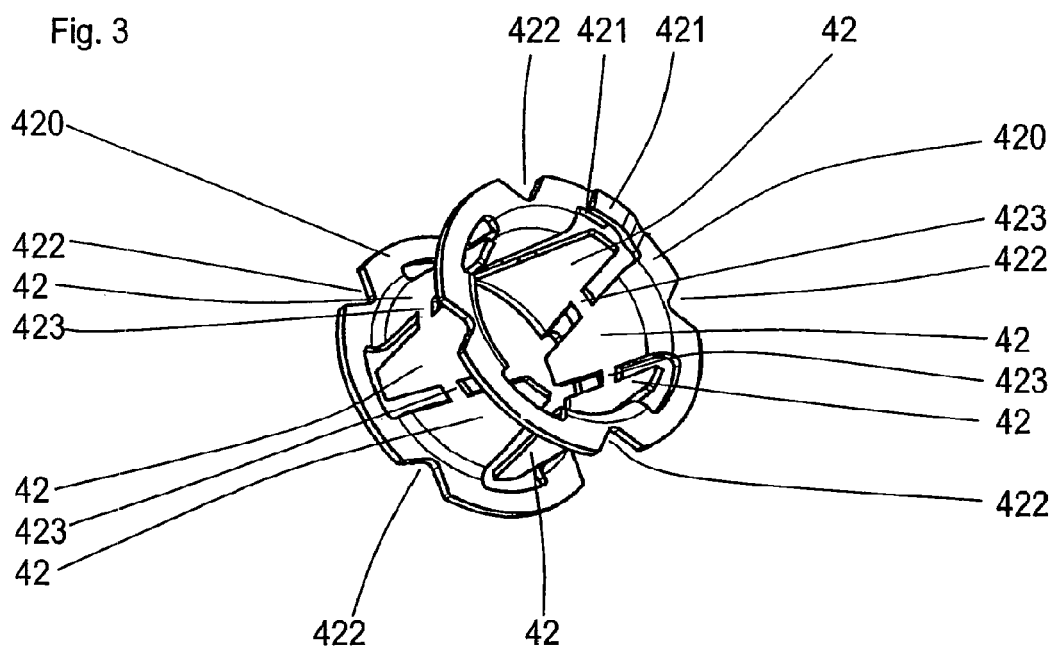

ELECTRIC MOTOR

BACKGROUND OF THE INVENTION (1) Field of the Invention

The invention relates to an electric motor comprising a permanent magnet rotor, which is supported rotationally about a central axis, a wound stator having a cylinder ring-shaped stator winding, claw poles, which are disposed perpendicularly to ring disc-shaped stator plates and around the central axis, and a cylinder jacket-shaped yoke ring, the length of the claw poles in the axially parallel direction being clearly greater than half the inner diameter of the stator.

(2) Description of the Related Art

The most common manner of producing claw pole stators consists in bending off the pre-punched claws from the center of a disc perpendicularly thereto. In this manner the maximum length of the claws in the axial direction is limited to approx. half the inner diameter of the stator. The achievable power of such motors is therefore limited and it is sometimes necessary to arrange a plurality of stators in succession.

An electric motor of the generic kind is disclosed in US 2002/0180302 A1. In the electric motor disclosed, the stator is composed of four components. The claw poles are punched out from lamellar sheet metals, and then bent to form a ring, the ends of which are connected to one another. Two of these bent claw pole sheet metals are then mounted together with two other stator sheet parts. This method is relatively cumbersome and unreliable. The large number of joints further increases the magnetic resistance and thereby reduces the efficiency of the motor.

BRIEF SUMMARY OF THE INVENTION

It is therefore, the object of the invention to provide an electric motor, in which the stator is composed of the least number of components, requires simple assembly and has a robust structure and optimum efficiency, thereby enabling greater design flexibility, usability of installation space and thus an economic construction.

This objective is solved according to the invention in that the magnetically conductive part of the stator comprises a cylinder jacket-shaped yoke ring and two ring disc-shaped stator plates, the stator plates are each designed as a single piece with a plurality of claw poles and the ring disc-shaped stator plates comprise ends, which are connected to one another. This helps achieve a small number of parts and accordingly simpler assembly and a robust construction. Furthermore, it also enables design freedom, usability of installation space and thus an economic construction.

The claw poles designed as a single piece with the ring disc-shaped stator plates are connected to one another mechanically preferably by means of thin webs in a pre-assembly state. This increases the mechanical stability during the handling in the further production process or also in the assembled state.

In order to prevent a loss of the magnetic flux by way of the thin webs, it is greatly advantageous to the efficiency of the electric motor if the webs are cut off or removed in the assembled state. The ends of the ring disc-shaped stator plates are designed in an overlapping manner. An electric resistance welding is thus easily possible. This can be accomplished cost-effectively and is sufficiently permanent.

In a further improvement of this embodiment, the webs are sheet-metal webs by means of which the claw poles are connected to one another forming a single piece. This is a requirement in order to punch out both the north poles and the south poles from a single sheet-metal strip and to provide them with the cylindrical shape by rolling them together. This embodiment can be preferred for economic reasons. From the physical aspect, the sheet-metal webs can lead to magnetic short circuits, if their cross-sectional area is not dimensioned to be sufficiently small. In the case of thin sheet-metal webs, these go into magnetic saturation and thus limit the magnitude of the magnetic flux in the webs. The number of the sheet-metal webs also should be kept as low as possible. It would be possible to achieve optimum efficiency if these connecting webs are removed in the final state.

The yoke ring should be connected to the stator plates as far as possible without play in order to achieve low magnetic resistance and thus high efficiency. Preferably the yoke ring is caulked with the stator plates. This connection can be produced easily in that the yoke ring is slotted at several locations in its axial boundary area and that sheet-metal bridges adjoining the slots are deformed inwardly in the radial direction. Due to the deformation of the sheet-metal bridges, the yoke ring is pulled inwardly towards the ring disc-shaped stator plates, thereby reducing the magnetic resistance in this area. Furthermore, the sheet-metal bridges also form a form-fit joint between the yoke ring and the ring disc-shaped stator plates—thus also the claw poles in the axial direction.

In order to set the distance between the two ring disc-shaped stator plates having the claw poles, the stator plates should be connected to one another by means of an electrically insulating plastic material. This is designed preferably such that the claw poles are encapsulated by injection-molding with malleably plastic material that can be processed, in the form of an insulating body for the stator winding.

In a further improvement of this embodiment of the invention, it is suggested to form the insulating body with insulation displacement contacts, a projection being provided on the insulating body in the axial direction for each winding wire to be connected, which projection comprises a receiving slot for a lead and a mounting opening for a contact pin.

The insulating body is expediently designed as a single piece with fixing means for a printed circuit board. The fixing means are composed of a stop and a snap-on means. The stop determines the axial position of the printed circuit board in relation to the insulating body and the snap-on means ensure that the printed circuit board is securely held in this position, wherein said snap-on means represents a form-fit connection in the radial direction and can be overcome only axially under a force effect. The printed circuit board comprises openings the diameters of which are adapted to the snap-on means. It is thus possible to rapidly and easily fix the printed circuit board on the insulating body, provision being further made for the contact pin to firstly comprise an insulation displacement geometry and secondly to be designed as a solder-less press-fit pin, which is electrically connected to the printed circuit board. Due to this design of the contact pin, it is possible to simultaneously produce an electrical connection between the stator winding and the printed circuit board when the printed circuit board is mounted. The contact pins are preferably press-fitted into the printed circuit board before mounting the latter.

The invention also comprises a centrifugal pump driven by an electric motor of the type described above. When using the electric motor in a centrifugal pump, it is suggested that the insulating body be designed as a single piece with a containment shell, which delimits a wet chamber from a dry chamber of the centrifugal pump. This helps cut down on the insulating body as an additional component.

In a particularly preferred further improvement of the invention, the containment shell is made of a plastic material that is transparent to laser light of a wavelength or a wavelength range, the containment shell is heat-sealed as a component of a second housing part to the first housing part and the containment shell is heat-sealed as a component of a second housing part to a motor housing part. The first housing part or the motor housing part is made of a material that absorbs the same laser light. This arrangement makes it possible to join the first housing part to the second housing part and the second housing part to the motor housing part permanently and tightly by using the laser transmission welding process.

The preferred method for producing claw pole stators comprises the following steps: punching out air gaps from a magnetically conductive sheet-metal strip so that webs are retained, connecting the north poles and the south poles to one another mechanically,—rolling the sheet-metal strip to form a tubular stator part,—connecting the ends of the sheet metal strip to one another,—encapsulating the tubular stator part by injection-molding with insulating plastic material and punching out the webs.

Additional process steps are: winding the stator and inserting the winding ends in receiving slots of an insulating body,—joining a yoke ring and mechanically fixing the yoke ring on the wound stator part.

BRIEF DESCRIPTION OF THE DRAWINGS

An exemplary embodiment is explained in detail below with reference to the drawings in which:

FIG. 1 shows a ring disc-shaped stator plate with claw poles,

FIG. 2 shows two stator plates that are separated from one another,

FIG. 3 shows two stator plate areas, which are connected to one another by means of sheet-metal bridges.

DETAILED DESCRIPTION OF THE INVENTION

Figure 4:
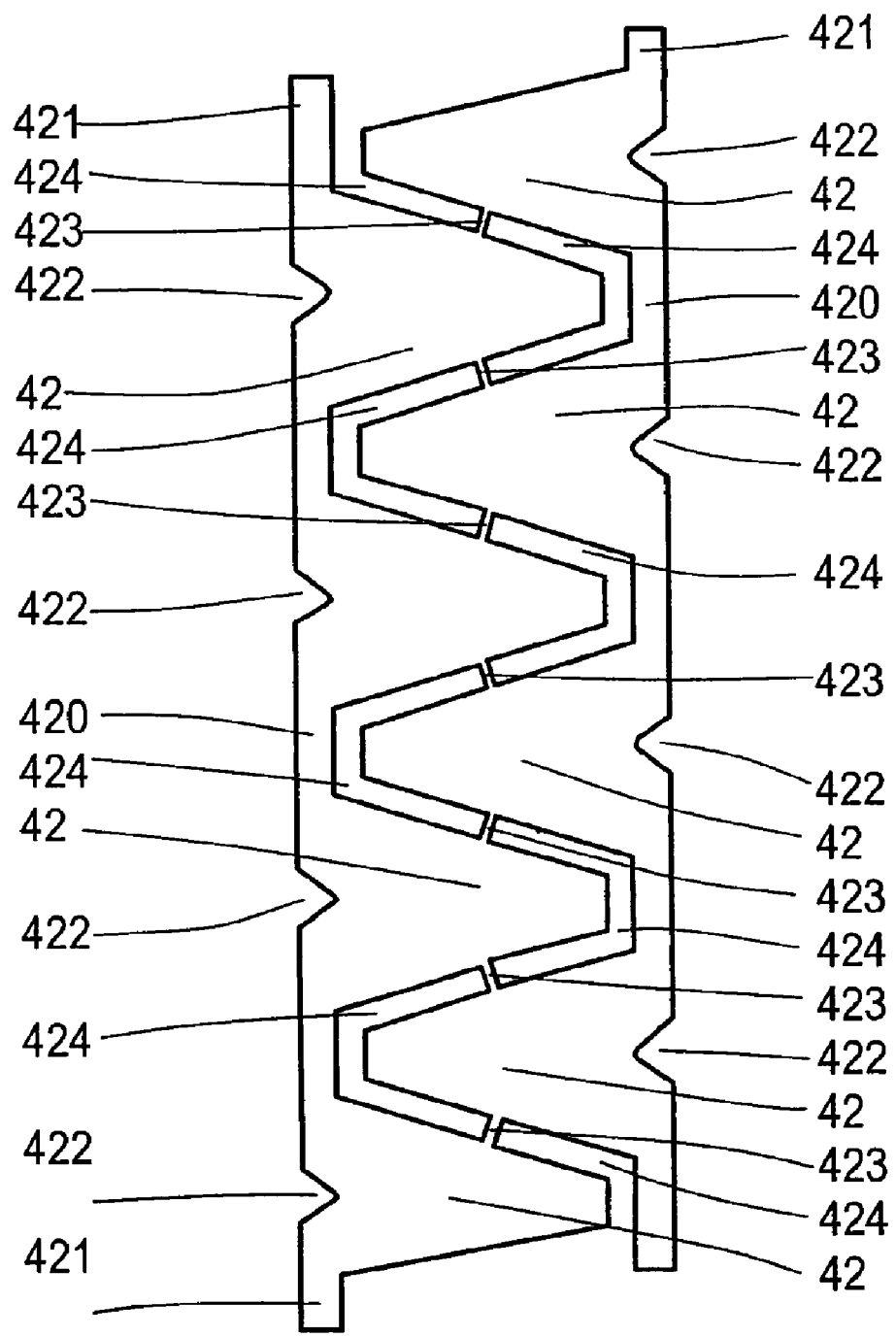
FIG. 4 shows a flat stator plate strip.

In describing preferred embodiments of the present invention illustrated in the drawings, specific terminology is employed for the sake of clarity. However, the invention is not intended to be limited to the specific terminology so selected, and it is to be understood that each specific element includes all technical equivalents that operate in a similar manner to accomplish a similar purpose.

FIG. 1 shows a ring disc-shaped stator plate 420 having four claw poles 42, which are bent off from the stator plate 420 perpendicularly thereto, the stator plates 420 comprising ends 421 which are welded to one another in an overlapping manner. The circumference of the ring disc 420 comprises V-shaped recesses 422, which are distributed uniformly over the circumference. The claw poles are provided with a trapezoidal shape for the purpose of reducing a detent torque, the claw poles being tapered towards their free ends.

FIG. 2 shows a first embodiment with two ring disc-shaped stator plates 420 with their claw poles 42 facing one another, wherein each claw pole 42 of the first stator plate 420 follows a claw pole of the second stator plate 420. Both the stator plates 420 are shown in their correct positions; however they are not in contact with one another. In the installation state, the stator plates are held by means of an insulating body. The insulating body is made of injection-molded plastic material and is molded around the stator plates for this purpose, wherein connecting means and fixing means are also formed additionally.

FIG. 3 shows a second embodiment of the invention, in which the stator plates 420 with the claw poles 42 are punched out of a single sheet-metal strip, the claw poles 42 being connected to one another by means of sheet-metal bridges 423. The sheet-metal bridges can remain in the stator in the final assembly state if they are designed to be sufficiently thin. However, they reduce the efficiency of the motor. It would be more advantageous here to remove the bridges. This is associated with higher production expenditure. The geometry of the stator with the exception of the sheet-metal bridges 423 corresponds to the arrangement shown in FIG. 2. Two claw poles 42 are not connected to one another by means of sheet-metal bridges; instead they form the ends of said sheet-metal strip. The ends 421 of the ring disc-shaped stator plates 420 are welded to one another similarly to FIGS. 1 and 2. The welding can be carried out in a welding unit in which the inner diameter of the claw pole ring is calibrated.

FIG. 4 shows a sheet-metal strip from which air gap areas 424 are punched out so that webs 423 and V-shaped recesses are retained. This sheet-metal strip is rolled to form a tube in the further production process and the ends are connected to one another. Then the tube is encapsulated by injection-molding with plastic material in one or more work steps in order to connect the claw poles 42 mechanically to a magnetically non-conducting material. The webs 424 are then superfluous and can be removed. This takes place preferably by means of radial punching. For this purpose, the plastic material can be recessed in the area of the webs 423 during the encapsulation by injection-molding. Alternatively, the plastic material is removed together with the webs 423 during the punching process. Since the area of this punch-out is small, there is no necessity of any additional insulating measures.

Figure 5:
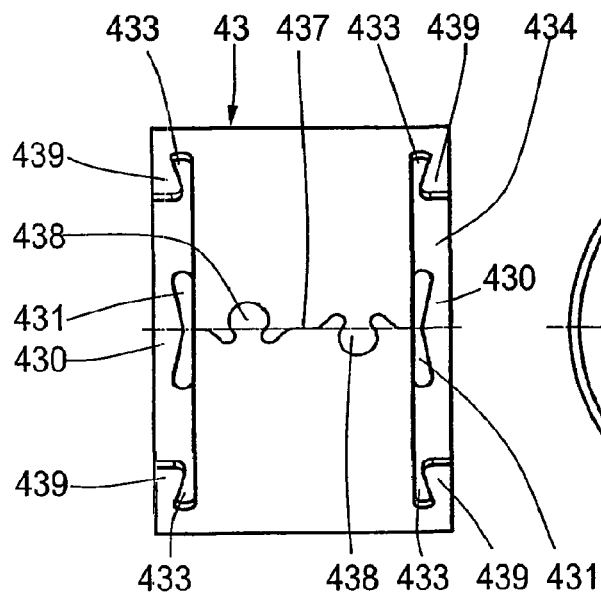
FIG. 5 shows a right side view of a tubular yoke ring.

FIG. 5 shows a right side view of a tubular yoke ring 43, which is punched out from a sheet-metal strip and rolled. Both the ends of the sheet-metal strip are connected to one another at a joint 437. The joint is created here in the form of form-fitting and button-like connecting means 438 corresponding to one another. The yoke ring comprises slots 431 (seen on its back side here), which are disposed on the periphery of the yoke and in the boundary area of the yoke ring and which are tapered towards their center and the ends of which have radii.

Figure 7:
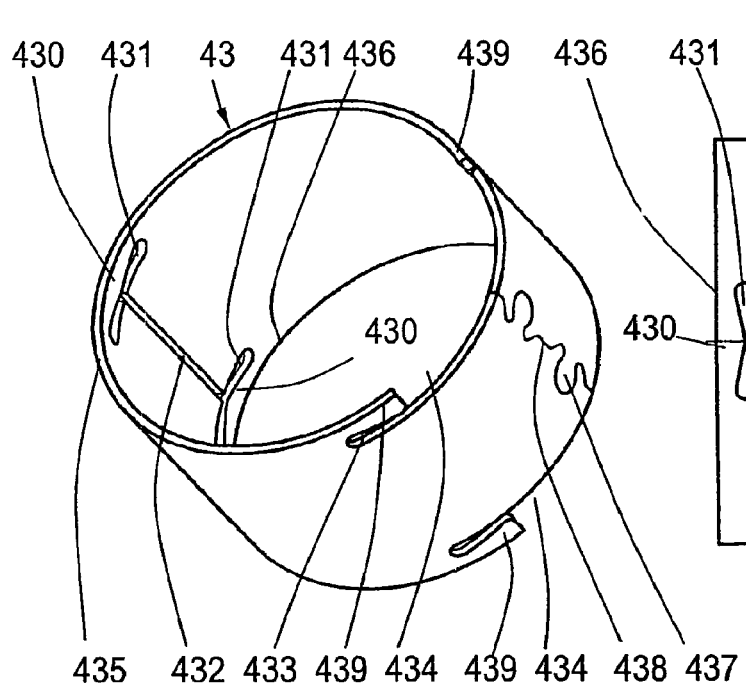
FIG. 7 shows a spatial representation of the yoke ring.
Figure 8:
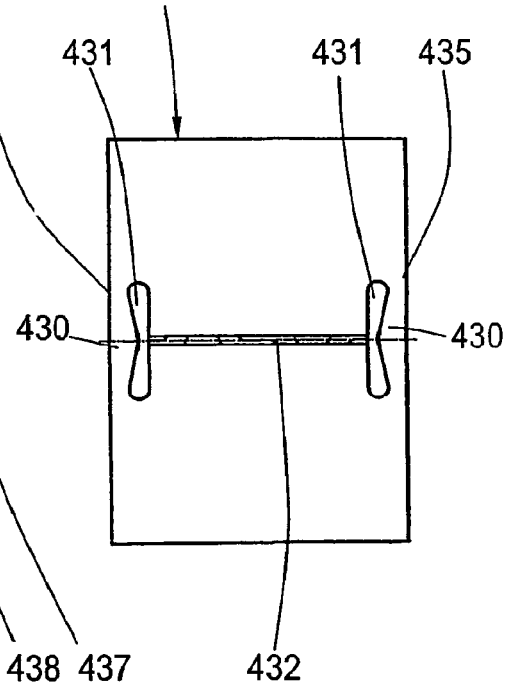
FIG. 8 shows a left side view of the yoke ring.

As is clearly evident from FIGS. 7 and 8, two slots 431 are present, which are disposed in the same peripheral area but on opposing boundaries 435, 436. Both the slots 431 are connected to one another by means of a connection slot 432, which emanates from the center of each slot 431. The slots 431 and 432 together form an H-shape. The slots 431 each delimit a web 430 from the body of the yoke. FIGS. 5 and 7 further show open slots 433, which are open towards an opening 434. By means of the slots 433, sheet-metal tongues 439 are formed, which by bending over in the radial direction (inwardly) serve for securing the stator plates 420 in the axial direction. The sheet-metal bridges 430 serve both for securing the stator plates 420 in the axial direction and for reducing the diameter of the yoke. The radial deformation of the sheet-metal bridges 430 constricts the connection slot 432, if necessary till both the boundary areas of the connection slot 432 contact one another.

Figure 6:
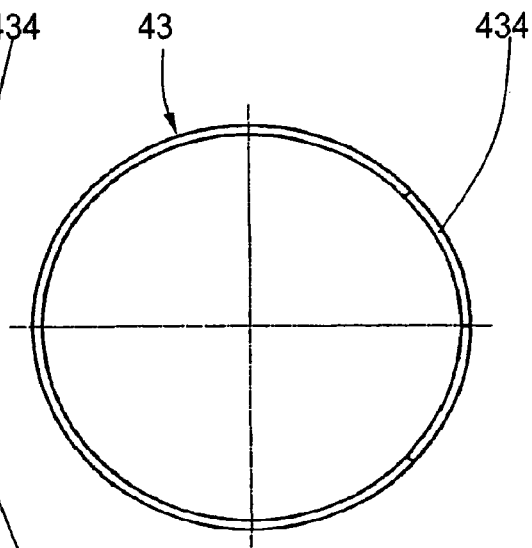
FIG. 6 shows a front view of the yoke ring.

FIG. 6 shows a front view of the yoke ring 43 with the opening 434. FIG. 7 shows a spatial representation of the yoke ring 43 and FIG. 8 shows a side view thereof (from the left).

Figure 9:
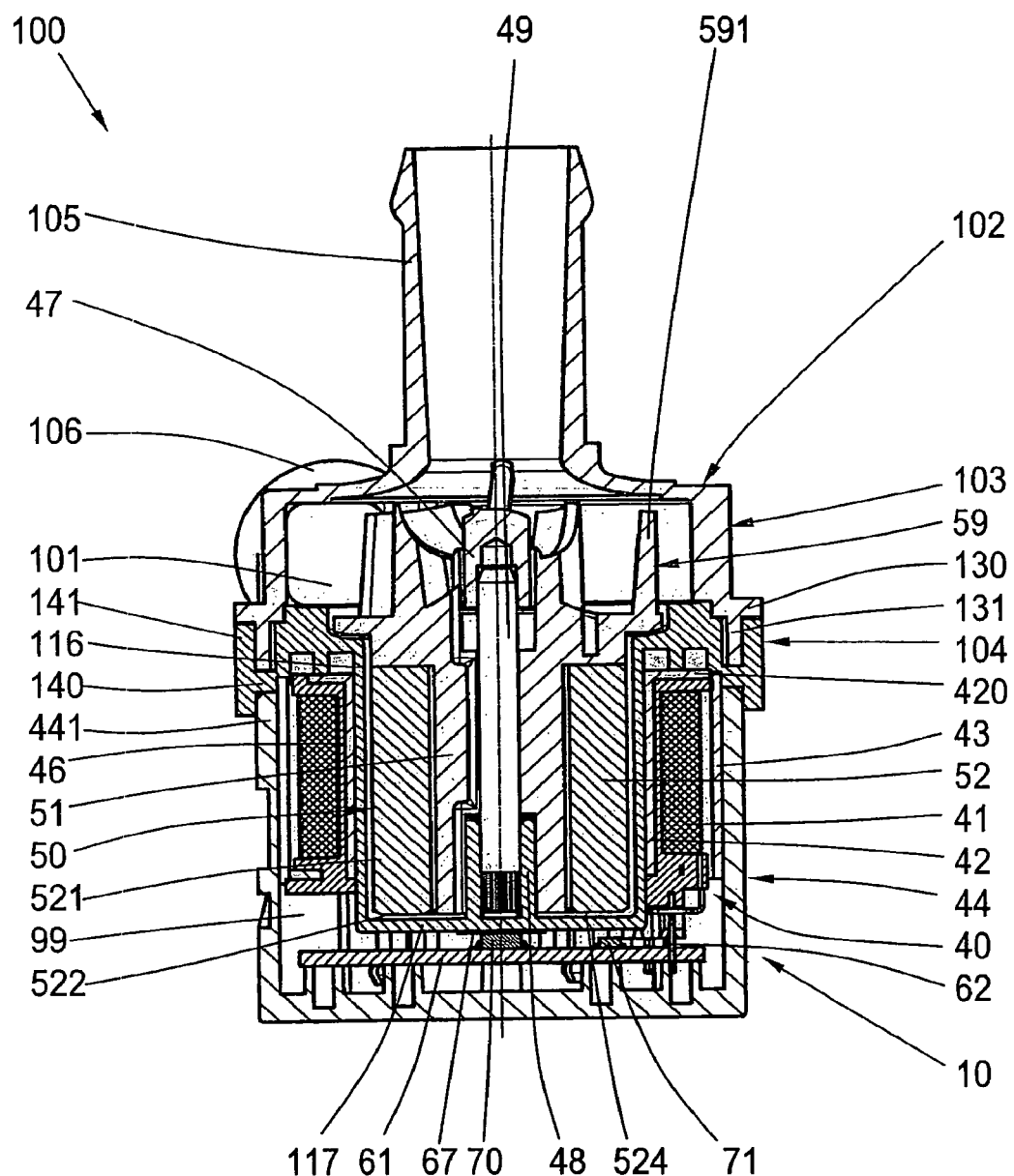
FIG. 9 shows a side view of a centrifugal pump of the invention.

FIG. 9 shows a side view of an inventive centrifugal pump 100, with a pump housing 102 comprising a first housing part 103 and a second housing part 104 connected thereto. A motor housing part 44 delimits a dry chamber, which is filled out by a stator of an electronically commutated direct current motor and its control electronic system. The motor housing part 44 is attached to the second housing part 102 [sic; 104]. The first and the second housing parts 103, 104 delimit a wet chamber 101 of the centrifugal pump. The second housing part 104 is formed as a single piece with a containment shell 116, which separates the wet chamber 101 from a dry chamber 99.

The wet chamber 101 comprises an axle 49, which is permanently installed between a containment shell-side axle mount 48 and a suction connection-side axle mount 47. A knurl on the end of the axle prevents a rotation of the axle 49 during the pump operation. A fixed bearing 54 is supported rotationally on the axle 49, which fixed bearing is press-fitted into a hollow shaft 51 of the rotor 50. The shaft 51 is designed as a single piece with a pump impeller 59, which comprises a plurality of approximately spirally-shaped vanes 591 for conveying the liquid. The front surfaces of the fixed bearing 54 can be supported axially against the containment shell-side axle mount 48 and against the suction connection-side axle mount 47 by positioning thrust washers in between. A cylindrically hollow ferrite magnet 52 is glued on the hollow shaft 51, an elastic adhesive being used, which is inserted in four or five axially parallel grooves 511 formed in the hollow shaft.

The dry chamber 99 comprises the stator 40 of the electronically commutated direct current motor 10, which is designed in the form of a cylindrically hollow stator winding 41, its magnetic field being guided during operation to the periphery of the containment shell 116 by means of claw poles in an alternating manner and interacting with the cylindrically hollow permanent magnet 52 in the wet chamber 101. The magnetic circuit is closed by a yoke ring 43, which is connected to the claw poles 42. The claw poles 42 are provided by means of encapsulating them by injection-molding with an insulating body 46, which connects the claw poles 42 to one another mechanically, but not magnetically. The stator 40 comprises four pairs of poles in the present example. The insulating body 46 is shaped in such a way geometrically that the winding wires of the stator winding 41 can be connected to contact pins 62 comprising insulation displacement contacts, which can be fixed mechanically in the insulating body 46. The contact pins 62 are formed as combination contacts and their ends located opposite to the insulation displacement contact 63 are press-fitted into a printed circuit board 61, thereby contacting the latter. For this purpose, the contact pins 62 comprise one or two deformable press-fit zones. The printed circuit board 61 comprises a Hall sensor 71, an integrated circuit 70 (IC), a PTC for the winding shield, power components and connector pins 64 for the voltage supply. The motor housing part 44 comprises a connector housing 65 in which the connector pins 64 are disposed. Electronic components with high heat losses are cooled by means of heat conducting foils 67 in the direction of the wet chamber 101. Conductor paths, which serve for the contacting of components to be cooled, are dimensioned so as to provide the broadest possible conductor paths 66 on the printed circuit board 61 for easier dissipation of heat. In order to achieve a particularly good utilization of the printed circuit board 61 and optimum heat dissipation, the different conductor paths 66 are designed with varying widths, depending on the amount of heat arising in the component connection to be contacted. A longitudinal groove is molded in the form of a cooling channel in the shaft 51 between a base 117 of the containment shell 116 and the pump impeller 59. This cooling channel enforces a continuous circulation of the conveying medium even in the interior of the containment shell 116. The printed circuit board is disposed between a front side 45 of the motor housing 44 and the base 117 of the containment shell 116 and is held in heat-conductive contact with the base 117 by means of the heat conducting foil 67.

The first housing part 103 comprises a first flange 130 and a first ring 131 attached thereto. The second housing part 104 comprises a second flange 140 and a second ring 141 attached thereto. The motor housing part comprises a third ring 441. The second flange 140 and the second ring 141 together form a T-shaped cross-section. Four sealing areas 133, 144, 145 and 444 are provided. The first sealing area is located on the radially outer side of the first ring 131 on the first housing part 103. The second sealing area 144 is located on the opposing radially inner side of the second ring 141 and of the second housing part 104. Likewise, the third sealing area 145 is located on the radially inner side of the second ring 141 and of the second housing part 104. The fourth sealing area 444 is located facing the third sealing area and on the radially outer side of the third ring 441 and of the motor housing part 44. The second housing part 104 is made of a material that is permeable to laser light of a wavelength or a wavelength range. The first housing part 103 and the motor housing part 44 are made of a material that absorbs the same laser light. A laser beam can thus be guided up to a joint without significantly heating up the transparent material. Here, the beam hits the material, which absorbs the light and converts it into heat, thereby melting the plastic and causing it to form a deep joint with the adjoining material.

Since both the sealing areas to be welded are located close to one another, it is easily possible to produce both the joints in one welding unit and in one work step. The welding unit can comprise two individual lasers, each laser beam being used to produce a welding seam. Alternatively, the welding unit can comprise a single laser, the output beam of which is divided by a beam splitter into two bundles of rays, each of which produces one welding seam. In the present example, the laser beams are focused radially on the pump housing.

Modifications and variations of the above-described embodiments of the present invention are possible, as appreciated by those skilled in the art in light of the above teachings. It is therefore to be understood that, within the scope of the appended claims and their equivalents, the invention may be practiced otherwise than as specifically described.

What is claimed is:

1. An electric motor comprising:
    a permanent magnet rotor;
    a central axis for rotationally supporting the magnet rotor;
    a wound stator including a magnetically conductive part and a cylinder ring-shaped stator winding, the wound stator having an inner diameter;
    two ring disc-shaped stator plates, each stator plate having ends extending in the peripheral direction;
    claw poles; and
    a cylinder jacket-shaped yoke ring, wherein the magnetically conductive part of the stator is made up of the cylinder jacket-shaped yoke ring and the two ring disc-shaped stator plates, with each of the stator plates having a plurality of the claw poles disposed perpendicularly to the ring disc-shaped stator plates and around the central axis, and each of the claw poles having a length greater than the inner diameter of the wound stator and the ends of the ring disc-shaped stator plates being connected to one another.

2. The electric motor according to claim 1, further comprising thin webs, and wherein the claw poles comprise first claw poles of north poles which are connected mechanically to second claw poles of south poles in a pre-assembly state by means of the thin webs.

3. The electric motor according to claim 2, wherein the thin webs are cut off or removed in a final assembly state.

4. The electric motor according to claim 1, wherein the ends of each ring disc-shaped stator plate are welded to one another.

5. The electric motor according to claim 2, wherein the thin webs are sheet metal webs for connecting the claw poles to one another forming a single piece.

6. The electric motor according to claim 1, wherein the yoke ring is rigidly connected to the stator plates.

7. The electric motor according to claim 6, further comprising sheet-metal bridges, wherein the yoke ring is slotted at several locations in its axial boundary area and the sheet-metal bridges adjoin the slots and are deformed inwardly in the radial direction.

8. The electric motor according to claim 1, wherein both of the ring disc-shaped stator plates with the claw poles are connected to one another by means of an electrically insulating plastic material.

9. The electric motor according to claim 8, wherein the claw poles are encapsulated by injection-molding with malleably plastic material, in the form of an insulating body for the stator winding.

10. The electric motor according to claim 8, wherein the insulating body comprises:
a contact pin;
insulation displacement contacts; and
a projection provided in the axial direction for a wire of each winding to be connected, which projection includes a receiving slot for a lead and a mounting opening for the contact pin.

11. The electric motor according to claim 8, further comprising a printed circuit board and fixing means, wherein the insulating body is a single piece with the fixing means for fixing the insulating body to the printed circuit board.

12. The electric motor according to claim 11, wherein the fixing means comprises a stop and a snap-on means.

13. The electric motor according to claim 11, wherein the contact pin comprises an insulation displacement geometry and is a solderless press-fit pin, which is electrically connected to the printed circuit board.

14. A centrifugal pump comprising:
a pump mechanism driven by an electric motor having
a permanent magnet rotor;
a central axis for rotationally supporting the magnet rotor;
a wound stator including a magnetically conductive part and a cylinder ring-shaped stator winding, the wound stator having an inner diameter;
two ring disc-shaped stator plates, each stator plate having ends extending in the peripheral direction;
claw poles; and
a cylinder jacket-shaped yoke ring, wherein the magnetically conductive part of the stator is made up of the cylinder jacket-shaped yoke ring and the two ring disc-shaped stator plates, with each of the stator plates having a plurality of the claw poles disposed perpendicularly to the ring disc-shaped stator plates and around the central axis, and each of the claw poles having a length greater than the inner diameter of the wound rotor and the ends of the ring disc-shaped stator plates being connected to one another.

15. The centrifugal pump according to claim 13, further comprising an insulating body with a containment shell that defines a wet chamber and a dry chamber.

16. The centrifugal pump according to claim 14, wherein the containment shell is made of a plastic material that is transparent to laser light of at least one wavelength.

17. The centrifugal pump according to claim 15, wherein the containment shell is heat-sealed as a component of a second housing part to a first housing part.

18. The centrifugal pump according to claim 17, wherein the first housing part or the motor housing part is made of a material that absorbs the same laser light.

* * * * *